(12) United States Patent
Nakamura (10) Patent No.: US 8,738,065 B2
(45) Date of Patent: May 27, 2014

(54) RADIO COMMUNICATION SYSTEM, LARGE CELL BASE STATION, AND COMMUNICATION CONTROL METHOD

(75) Inventor: Kazutaka Nakamura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 208 days.

(21) Appl. No.: 12/896,774

(22) Filed: Oct. 1, 2010

(65) Prior Publication Data

US 2011/0081937 A1     Apr. 7, 2011

Related U.S. Application Data

(60) Provisional application No. 61/248,362, filed on Oct. 2, 2009.

(51) Int. Cl.
*H04M 1/00* (2006.01)

(52) U.S. Cl.
USPC ....... 455/522; 455/507; 455/63.1; 455/422.1; 455/444

(58) Field of Classification Search
USPC ............. 455/522, 507, 422.1, 449, 448, 63.1, 455/444
See application file for complete search history.

(56) References Cited

U.S. PATENT DOCUMENTS

| | | | | |
|---|---|---|---|---|
| 5,218,717 | A * | 6/1993 | Reitberger | 455/503 |
| 7,010,320 | B2 * | 3/2006 | Komatsu | 455/522 |
| 7,085,559 | B2 * | 8/2006 | Sato et al. | 455/422.1 |
| 7,483,712 | B2 * | 1/2009 | Komatsu | 455/522 |
| 8,170,600 | B2 * | 5/2012 | Song et al. | 455/522 |
| 8,219,137 | B2 * | 7/2012 | Duschesne et al. | 455/522 |
| 8,260,233 | B2 * | 9/2012 | Kobayashi | 455/214 |
| 8,285,322 | B2 * | 10/2012 | Chen et al. | 455/525 |
| 2002/0114379 | A1 * | 8/2002 | Uesugi et al. | 375/219 |
| 2003/0103477 | A1 * | 6/2003 | Doi et al. | 370/334 |
| 2004/0229603 | A1 * | 11/2004 | Sato et al. | 455/422.1 |
| 2005/0130662 | A1 * | 6/2005 | Murai | 455/444 |
| 2005/0282501 | A1 * | 12/2005 | Oura | 455/67.13 |
| 2006/0019665 | A1 * | 1/2006 | Aghvami et al. | 455/444 |
| 2006/0111137 | A1 * | 5/2006 | Mori et al. | 455/522 |
| 2006/0165032 | A1 * | 7/2006 | Hamalainen et al. | 370/328 |
| 2007/0270151 | A1 * | 11/2007 | Claussen et al. | 455/444 |
| 2008/0069028 | A1 * | 3/2008 | Richardson | 370/328 |
| 2008/0146154 | A1 * | 6/2008 | Claussen et al. | 455/63.1 |
| 2009/0163144 | A1 * | 6/2009 | Nakatsugawa | 455/67.13 |

(Continued)

OTHER PUBLICATIONS

HeNB DL Performance with Adaptive Power, 3GPP TSG-RAN WG4 #52, R4-093146, Aug. 24, 2009, 4 pages.

*Primary Examiner* — Temesgh Ghebretinsae
*Assistant Examiner* — MD Talukder
(74) *Attorney, Agent, or Firm* — Duane Morris LLP (57) ABSTRACT

The large cell base station 100 calculates the small cell base station interference amount ratio which is a ratio of the RSRP (small cell base station to large cell terminal) being the amount of interference which is received from the small cell base station 300, to I (large cell terminal) regarded as the total amount of interference which is received by the radio terminal 200 being connected to the large cell base station 100. Furthermore, when the small cell base station interference amount ratio is equal to or large than the threshold α, the large cell base station 100 then sets the transmission power adjustment coefficient so that the SINR in the radio terminal 200 would be equal to or larger than β [dB] being a predetermined decibel value, and transmits the set transmission power adjustment coefficient to the small cell base station 300.

7 Claims, 5 Drawing Sheets

(56) References Cited

U.S. PATENT DOCUMENTS

| | | | |
|---|---|---|---|
| 2009/0233594 A1* | 9/2009 | Duschesne et al. | 455/423 |
| 2009/0247166 A1* | 10/2009 | Luo et al. | 455/436 |
| 2009/0285113 A1* | 11/2009 | Yavuz et al. | 370/252 |
| 2010/0027694 A1* | 2/2010 | Touboul et al. | 375/260 |
| 2010/0029319 A1* | 2/2010 | Higuchi et al. | 455/522 |
| 2010/0087149 A1* | 4/2010 | Srinivasan et al. | 455/63.1 |
| 2010/0087221 A1* | 4/2010 | Srinivasan et al. | 455/522 |
| 2010/0118844 A1* | 5/2010 | Jiao et al. | 370/338 |
| 2010/0151870 A1* | 6/2010 | Piercy et al. | 455/450 |
| 2011/0039589 A1* | 2/2011 | Skov | 455/501 |
| 2011/0081937 A1* | 4/2011 | Nakamura | 455/522 |
| 2011/0086665 A1* | 4/2011 | Nakamura | 455/522 |
| 2011/0117953 A1* | 5/2011 | Kim et al. | 455/522 |
| 2011/0250881 A1* | 10/2011 | Michel et al. | 455/423 |
| 2011/0312268 A1* | 12/2011 | Wei | 455/7 |
| 2011/0317742 A1* | 12/2011 | Kawahatsu et al. | 375/132 |
| 2012/0015659 A1* | 1/2012 | Kalyani et al. | 455/436 |
| 2012/0028630 A1* | 2/2012 | Yamamoto et al. | 455/422.1 |
| 2012/0094702 A1* | 4/2012 | Furueda et al. | 455/501 |
| 2012/0129527 A1* | 5/2012 | Takeuchi et al. | 455/436 |
| 2012/0142334 A1* | 6/2012 | Sato et al. | 455/422.1 |
| 2012/0142364 A1* | 6/2012 | Duan | 455/450 |
| 2012/0157154 A1* | 6/2012 | Cho et al. | 455/522 |
| 2012/0231833 A1* | 9/2012 | Kolding et al. | 455/522 |
| 2012/0289269 A1* | 11/2012 | Kumagai | 455/507 |
| 2013/0150116 A1* | 6/2013 | Nakamura | 455/522 |

* cited by examiner

«RADIO COMMUNICATION SYSTEM, LARGE CELL BASE STATION, AND COMMUNICATION CONTROL METHOD

CROSS-REFERENCE TO RELATED APPLICATIONS

This application claims the benefit of priority under 35 U.S.C. section 119 of U.S. Provisional Application No. 61/248,362 filed Oct. 2, 2009, the disclosure of which is incorporated herein by reference in its entirety. Additionally, the disclosure of Japanese Patent Application No. 2009-231030 filed Oct. 2, 2009 is incorporated herein by reference in its entirety.

BACKGROUND OF THE INVENTION

1. Field of the Invention

The present invention relates to a radio communication system, a large cell base station, and a communication control method, the radio communication system being where a small cell base station forming a small cell smaller than a large cell formed by the large cell base station is installed within the large cell and a radio terminal is connected to the large cell base station.

2. Description of the Related Art

As the next generation radio communication system to achieve communications with a higher rate and a larger capacity than the third and 3.5th generation radio communication systems which are currently used, there is an LTE which is standardized by the 3GPP being a radio communication system standardizing body. The technical specifications of the LTE have been fixed by the 3GPP Release 8. Today, the Release 9, which is a functionally improved version of the Release 8, and the LTE Advanced, which is an advanced version of the LTE, have been discussed.

In addition, in the LTE Release 9, the standardization of specific functions and requirements of a small cell base station (Home eNodeB) is in progress. It is a small-sized base station which forms a cell (referred to as small cell) as a communication area with a radius of a several [m] to more than a dozen [m] and which can be installed indoor. The small cell base station is installed with a view to, dispersing the traffic of a large cell base station (Macro eNodeB) which forms a large cell (large cell) as a communication area with a radius of a several hundreds meters, and covering a dead area within the large cell.

Meanwhile, when the small cell base station is installed within the large cell, a downlink from the small cell base station to a radio terminal which is connected to the small cell base station may give interference to a radio terminal which is connected to the large cell base station. To suppress the interference, downlink transmission control methods for small cell base stations have been proposed.

For example, in the method disclosed in Non-patent Literature 1(3GPP RAN-WG4 R4-093146, "HeNB DL Performance with Adaptive Power", Qualcomm Europe.), (1) a small cell base station measures a field intensity at which a reference signal from the nearest large cell base station is received (i.e., RSRP: Reference Signal Received Power) and SINR (Signal to Interference and Noise Ratio) from the nearest large cell base station. The nearest large cell base station means herein a large cell base station corresponding to the largest RSRP among those measured by the small cell base station. (2) Thereafter, the small cell base station assumes that a radio terminal (large cell terminal) which is connected to the large base station is present in a place along a direction away from the large cell base station and also apart from the small cell base station by a distance of y [dB] in decibel. Then, the small cell base station controls the downlink transmission power of the small cell base station so that the SINR in the large cell terminal would be equal to or larger than x [dB]. (3) If the SINR in the large cell terminal does not become x [dB] or larger, the small cell base station decreases the downlink transmission power to a minimum value z [dBm]. Thereafter, the operations from (1) are repeated. It should be noted that x, y, and z are control variables and are determined by the system.

In the method disclosed in Non-patent Literature 2(3GPP RAN-WG4 R4-092063, "Analysis of HNB Coverage and HNB Interference to Macro UE for Enhanced Interference Management", Qualcomm Europe, NTT DOCOMO and Vodafone Group.), (1) a large cell base station detects a large cell terminal having come close to a small cell base station. Specifically, the large cell base station determines the large cell terminal fulfilling PL (small cell base station to large cell terminal)<r [dB] as a large cell terminal being near the small cell base station. The PL (small cell base station to large cell terminal) means herein a propagation loss from the small cell base station to the large cell terminal (path loss containing distance attenuation, shadowing loss, and feature insertion loss), and r is a control variable and is determined by the system. (2) Thereafter, the large cell base station notifies the small cell base station through a network if there is a large cell terminal near the small cell base station. (3) When there is a large cell terminal nearby, the notified small cell base station sets the downlink transmission power at a predetermined small value. On the other hand, when there is no large cell terminal nearby, the notified small cell base station sets the downlink transmission power at a predetermined large value.

However, according to the method disclosed in Non-patent Literature 1, the small cell base station controls the downlink transmission power regardless of if the large cell terminal is receiving considerable interference from the small cell base station. For this reason, there is a possibility that the small cell base station decreases the downlink transmission power even when the large cell terminal is not receiving considerable interference from the small cell base station. Thus, there is a problem such that the communication rate of the small cell base station is decreased more than necessary.

According to the method disclosed in Non-patent Literature 2, the small cell base station can figure out through a network if there is a large cell terminal near the small cell base station. For this reason, the method disclosed in Non-patent Literature 2 enables the small cell base station to perform the downlink transmission power control more effectively than the method disclosed in Non-patent Literature 1. However, whether or not the large cell terminal is receiving considerable interference from the small cell base station is not taken into consideration. Hence, there is a possibility that the small cell base station decreases the transmission power more than necessary when the small cell base station is giving not so severe interference to the large cell terminal. On the other hand, when the small cell base station is giving major interference to the large cell terminal, it may be desirable that the small cell base station further decrease the transmission power; however, such control is not performed.

SUMMARY OF THE INVENTION

In this respect, an objective of the present invention is to provide a radio communication system, a large cell base station, and a communication control method, with which interference that a radio terminal connected to a large cell base station receives from a small cell base station can be properly decreased.

A first aspect of the present invention is summarized as a radio communication system (radio communication system 1) in which a small cell base station (small cell base station 300a, 300b) forming a small cell (FC1, FC2) smaller than a large cell (MC1) formed by a large cell base station (large cell base station 100) is installed within the large cell and a radio terminal (radio terminal 200) is connected to the large cell base station. In the radio communication system, a network device formed of at least one of the large cell base station and a upper level device of the large cell base station includes: a ratio acquisition unit (ratio acquisition unit 121) configured to acquire a ratio of an amount of interference that the radio terminal receives from the small cell base station to a first amount of interference being regarded as a total amount of interference that the radio terminal receives; and an instruction unit (transmission power instruction unit 122) configured to instruct the small cell base station to control transmission power of a small cell downlink being a downlink in the small cell base station, based on the ratio acquired by the ratio acquisition unit.

In the radio communication system, the network device acquires a ratio of the amount of interference that the radio terminal being connected to the large cell base station receives from the small cell base station to the first amount of interference being regarded as the total amount of interference that the radio terminal receives, and instructs the small cell base station to control the transmission power, based on the acquired ratio. As a result, when the ratio of the amount of interference that the radio terminal connected to the large cell base station receives from the small cell base station to the first amount of interference is large and the interference which is received from the small base station is considerable, the transmission power of the small cell downlink in the small cell base station is decreased. On the other hand, when the ratio of the amount of interference which is received from the small cell base station to the first amount of interference is small and the interference which is received from the small cell base station is not considerable, the interference that the radio terminal connected to the large cell base station receives from the small cell base station can be properly decreased by, for example, maintaining or increasing the transmission power of the small cell downlink in the small cell base station, instead of unnecessarily decreasing the communication quality of the small cell base station.

A second aspect of the present invention is summarized that the instruction unit instructs the small cell base station to control the transmission power of the small cell downlink so that a communication quality of the downlink from the large cell base station to the radio terminal becomes a predetermined value.

A third aspect of the present invention is summarized that the instruction unit instructs the small cell base station to decrease the downlink transmission power when the ratio acquired by the ratio acquisition unit exceeds a predetermined threshold.

A fourth aspect of the present invention is summarized that the ratio acquisition unit acquires a field intensity at which the radio terminal receives a reference signal from the small cell base station, and the ratio acquisition unit acquires a ratio of the field intensity at which the reference signal is received, to the first amount of interference.

A fifth aspect of the present invention is summarized that the ratio acquisition unit calculates the first amount of interference by adding together a field intensity at which the radio terminal receives a reference signal from the small cell base station, a field intensity at which the radio terminal receives a reference signal from a large cell base station different from the large cell base station to which the radio terminal is connected, and thermal noise power.

A sixth aspect of the present invention is summarized that the ratio acquisition unit calculates the first amount of interference by dividing a field intensity at which the radio terminal receives a reference signal from the large cell base station, by a signal to interference and noise power ratio corresponding to a CQI from the radio terminal.

A seventh aspect of the present invention is summarized that the ratio acquisition unit calculates the first amount of interference by dividing a transmission power density of a large cell downlink being a downlink in the large cell base station by a propagation loss of the large cell downlink and further by dividing the result of the division by a signal to interference and noise power ratio corresponding to a CQI from the radio terminal.

An eighth aspect of the present invention is summarized that the instruction unit transmits any one of a value of maximum transmission power of the small cell base station and a variable determining the maximum transmission power of the small cell base station, to the small cell base station.

A ninth aspect of the present invention is summarized that a large cell base station which forms a large cell where a small cell base station forming a small cell smaller than the large cell is installed, a radio terminal being connected to the large cell base station. The large cell base station includes: a ratio acquisition unit configured to acquire a ratio of an amount of interference that the radio terminal receives from the small cell base station to a first amount of interference being regarded as a total amount of interference that the radio terminal receives; and an instruction unit configured to instruct the small cell base station to control transmission power of a small cell downlink being a downlink in the small cell base station, based on the ratio acquired by the ratio acquisition unit.

A tenth aspect of the present invention is summarized that a communication control method in a large cell base station which forms a large cell where a small cell base station forming a small cell smaller than the large cell is installed, a radio terminal being connected to the large cell base station. The method includes the steps of: the large cell base station acquiring a ratio of an amount of interference that the radio terminal receives from the small cell base station to a first amount of interference being regarded as a total amount of interference that the radio terminal receives; and the large cell base station instructing the small cell base station to control transmission power of a small cell downlink being a downlink in the small cell base station, based on the acquired ratio.

The aspects of the present invention can provide a radio communication system, a large cell base station, and a communication control method, with which interference that a radio terminal connected to a large cell base station receives from a small cell base station can be properly decreased.

DETAILED DESCRIPTION OF EXEMPLARY EMBODIMENTS

Hereinafter, embodiments of the invention are described by referring to the drawings. Specifically, description is given of (1) Configuration of Radio Communication System, (2) Operation of Radio Communication System, (3) Advantageous Effects, and (4) Other Embodiments. In the description of the drawings in the following embodiments, same or similar reference symbols are given to denote same or similar portions.

Figure 1:
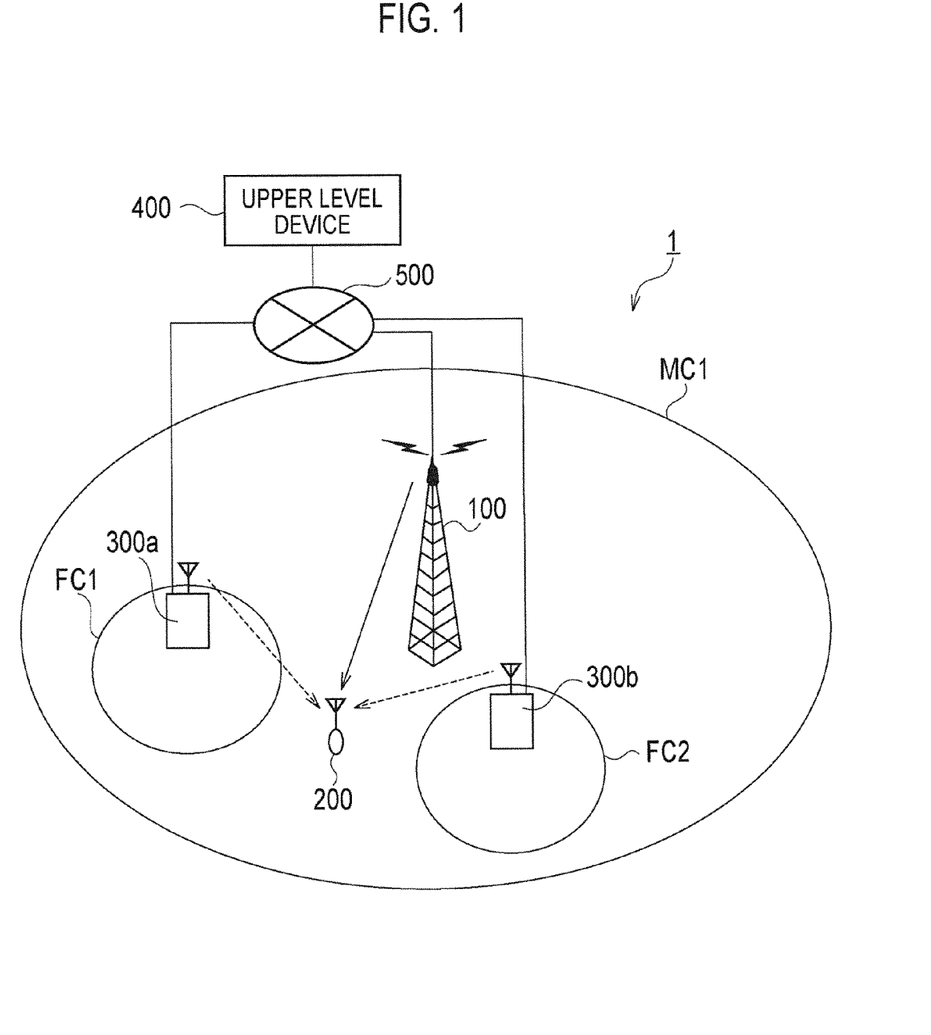
FIG. 1 is a general schematic configuration diagram of a radio communication system according to an embodiment of the present invention.

(1) Configuration of Radio Communication System (1.1) General Schematic Configuration of Radio Communication System FIG. 1 is a general schematic configuration diagram of a radio communication system 1 according to an embodiment of the present invention. The radio communication system 1 has, for example, a configuration based on LTE Release 9 which is the 3.9th generation (3.9G) mobile telephone system or a configuration based on LTE-Advanced which is positioned as the fourth generation (4G) mobile telephone system.

As shown in FIG. 1, the radio communication system 1 includes a large cell base station (e.g., macro cell base station) 100 forming a large cell (e.g., macro cell) MC1 and small cell base stations (e.g., femto cell base station or pico cell base station) 300a and 300b which respectively form small cells (e.g., femto cell or pico cell) FC1 and FC2. The radius of the large cell MC1 is, for example, several hundreds [m] and the radius of each of the small cells FC1 and FC2 is, for example, from several [m] to more than a dozen [m]. A radio terminal 200 is connected to the large cell base station 100.

It should be noted that, in the following description, the small cells FC1 and FC2 are simply referred to as "small cell FC" when they are not distinguished from each other and the small cell base stations 300a and 300b are simply referred to as "small cell base station 300" when they are not distinguished from each other.

The large cell base station 100 is installed by a carrier in a place according to the designing of station establishment in which interference between cells is considered. On the other hand, the small cell base station 300 is formed small enough that it can be installed in any location (specifically, indoor) by the user. The small cell base station 300 is installed within the large cell MC1 with a view to dispersing the traffic of the large cell base station 100 and covering a dead area inside the large cell MC1.

The large cell base station 100 is connected to a core network 500 through a dedicated line. On the other hand, the small cell base station 300 is connected to the core network 500 of its carrier through a general public line such as ADSL or FTTH. In addition, a upper level device 400 such as MME (Mobility Management Entity) is connected to the core network 500.

Suppose a case where the frequency band of a downlink (the link from the large cell base station 100 to the radio terminal 200, and hereinafter referred to as "large cell downlink") used for a communication when the large cell base station 100 is connected to and communicates with and the radio terminal 200 is the same as the frequency band of a downlink (the link from the small cell base station 300 to an unillustrated radio terminal, and hereinafter referred to as "small cell downlink") used for a communication when the small cell base station 300 is connected to and communicates with an unillustrated radio terminal. In this case, the radio terminal 200 which the large cell base station 100 is communicating with receives interference by a radio signal which is transmitted from the small cell base station 300 to the unillustrated radio terminal using the corresponding downlink.

In the embodiment, as described above, when the radio terminal 200 receives interference from the small cell base station 300, the large cell base station 100 decreases the interference by controlling the downlink transmission power of the small cell base station 300.

(1.2) Configuration of Large Cell Base Station

Figure 2:
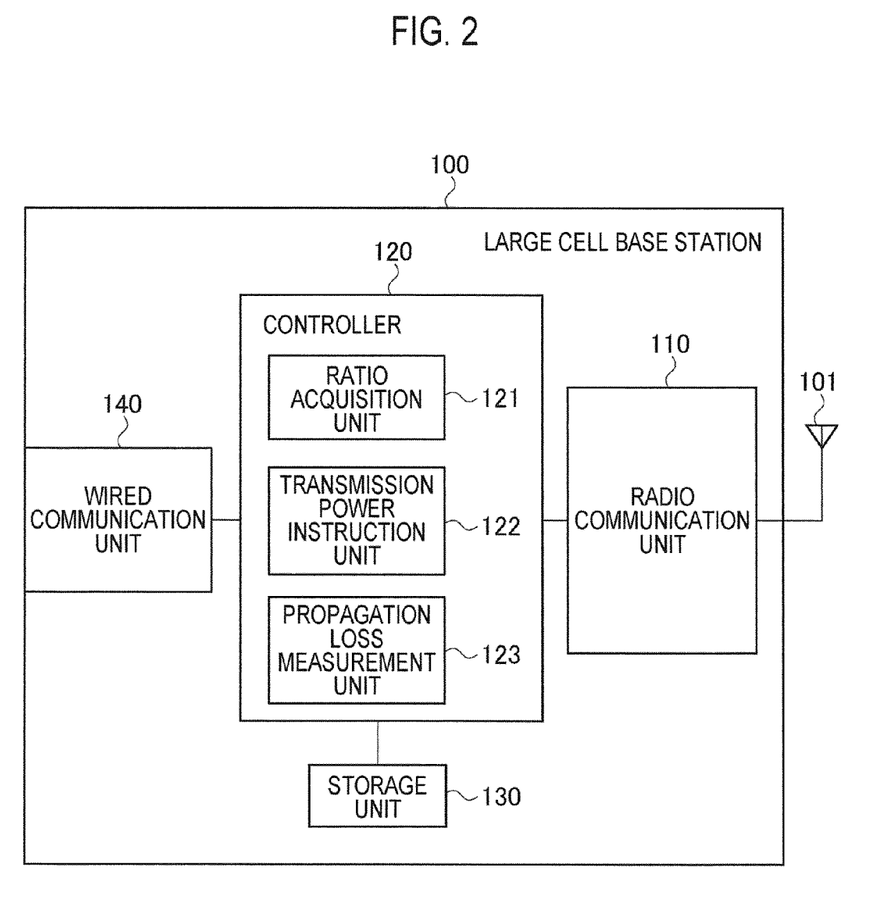
FIG. 2 is a block diagram showing a configuration of a large cell base station according to the embodiment of the present invention.

FIG. 2 is a block diagram showing a configuration of the large cell base station 100. As shown in FIG. 2, the large cell base station 100 includes an antenna unit 101, a radio communication unit 110, a controller 120, a storage unit 130, and a wired communication unit 140.

The radio communication unit 110 is configured of, for example, a radio frequency (RF) circuit, a base band (BB) circuit, and the like, and transmits and receive radio signals to and from the antenna unit 101. In addition, the radio communication unit 110 performs coding and modulation of a transmission signal and demodulation and decoding of a received signal.

From the radio terminal 200, the radio communication unit 110 receives information for obtaining the total amount of interference that the radio terminal 200 receives. The information for obtaining the total amount of interference that the radio terminal 200 receives includes herein: a CQI (Channel Quality Indicator); a field intensity at which the radio terminal 200 receives a reference signal from the small cell base station 300 (hereinafter referred to as "RSRP (small cell base station to large cell terminal)"); a field intensity at which the radio terminal 200 receives a reference signal from the large cell base station 100 to which the radio terminal 200 is connected (hereinafter referred to as "RSRP (large cell base station to large cell terminal)"); and a field intensity at which the radio terminal 200 receives a reference signal from a large cell base station to which the radio terminal 200 is not connected, i.e., a large cell base station different from the large cell base station 100 (hereinafter referred to as "different large cell base station") (hereinafter referred to as "RSRP (different large cell base station to large cell terminal)").

It should be noted that the RSRP (small cell base station to large cell terminal) is also used as information indicating the amount of interference that the radio terminal 200 receives from the small cell base station 300. Also, the RSRP (small cell base station to large cell terminal) is measured by the radio terminal 200 for each small cell base station 300 from which a reference signal is transmitted, and contains an ID which is identification information of the corresponding small cell base station 300. Furthermore, the RSRP (different large cell base station to large cell terminal) is measured by the radio terminal 200 for each different large cell base station from which a reference signal is transmitted.

The controller 120 is configured of, for example, a CPU and controls various functions included in the large cell base station 100. The storage unit 130 is configured of, for example, a memory and stores various types of information to be used for controlling the large cell base station 100 and doing the like. The wired communication unit 140 performs communications with the different large cell base station and the small cell base station 300 through the core network 500.

The controller 120 includes a ratio acquisition unit 121, a transmission power instruction unit 122, and a propagation loss measurement unit 123.

The ratio acquisition unit 121 acquires the CQI, the RSRP (small cell base station to large cell terminal), the RSRP (large cell base station to large cell terminal), and the RSRP (different large cell base station to large cell terminal) which are received by the radio communication unit 110.

Next, the ratio acquisition unit 121 calculates I (large cell terminal) as a value regarded as the total amount of interference that the radio terminal 200 receives. To calculate I (large cell terminal), any of the following first to third approaches is used.

In the first approach, the ratio acquisition unit 121 calculates a total of the RSRP (small cell base station to large cell terminal) and the RSRP (different large cell base station to large cell terminal).

Thereafter, the ratio acquisition unit 121 obtains I (large cell terminal) by adding a predetermined thermal noise power value to the total of the RSRP (small cell base station to large cell terminal) and the RSRP (different large cell base station to large cell terminal). The thermal noise power value is stored in the storage unit 130 or is transmitted from the radio terminal 200.

In the second approach, the ratio acquisition unit 121 calculates an SINR (Signal to Interference and Noise Ratio) corresponding to the large cell downlink in the radio terminal 200 on the basis of the CQI. Thereafter, the ratio acquisition unit 121 obtains I (large cell terminal) by dividing the RSRP (large cell base station to large cell terminal) by the SINR.

In the third approach, the ratio acquisition unit 121 calculates an SINR corresponding to the large cell downlink in the radio terminal 200 on the basis of the CQI.

The propagation loss measurement unit 123 measures a propagation loss (hereinafter referred to as "uplink propagation loss") of an uplink (the link from the radio terminal 200 to the large cell base station 100 and hereinafter referred to as "large cell uplink") used for a communication when the radio terminal 200 is connected to and communicates with the large cell base station 100. The propagation loss contains distance attenuation, a shadowing loss, and a feature insertion loss.

The ratio acquisition unit 121 acquires the uplink propagation loss measured by the propagation loss measurement unit 123. Furthermore, the ratio acquisition unit 121 estimates the propagation loss of the large cell downlink (hereinafter, referred to as "downlink propagation loss") PL from the uplink propagation loss. For example, the ratio acquisition unit 121 considers the uplink propagation loss as the downlink propagation loss. Also, the ratio acquisition unit 121 considers a value in which a predetermined correction value is added to the uplink propagation loss, as the downlink propagation loss.

Thereafter, the ratio acquisition unit 121 acquires a transmission power density P of the large cell downlink (hereinafter, referred to as "downlink transmission power density") in the large cell base station 100. For example, the downlink transmission power density P is stored in the storage unit 130. Furthermore, the ratio acquisition unit 121 obtains I (large cell terminal) by dividing the downlink transmission power density P by the downlink propagation loss PL and further diving the resultant value obtained by the division by the SINR.

After the I (large cell terminal) is calculated by any of the above-described first to third approaches, the ratio acquisition unit 121 divides the RSRP (small cell base station to large cell terminal) by the I (large cell terminal) so as to calculate the ratio of the amount of interference that the radio terminal 200 receives from the small cell base station 300 corresponding to the RSRP (small cell base station to large cell terminal) to the total amount of interference that the radio terminal 200 receives (hereinafter, referred to as "small cell base station interference amount ratio"). If the ratio acquisition unit 121 acquires multiple RSRPs (small cell base station to large cell terminal), in other words, when the radio terminal 200 is receiving interference from multiple small cell base stations 300, the small cell base station interference amount ratio is calculated for each small cell base station 300 by dividing the RSRP (small cell base station to large cell terminal) corresponding to the small cell base station 300 by the I (large cell terminal).

The transmission power instruction unit 122 determines if the calculated small cell base station interference amount ratio is equal to or larger than a threshold $\alpha$. The threshold $\alpha$ is herein a real number from 0 to 1 and is predetermined in the radio communication system 1 and stored in the storage unit 130.

When the small cell base station interference amount ratio is equal to or larger than the threshold $\alpha$, it is regarded that the radio terminal 200 is receiving considerable interference from the small cell base station 300 corresponding to the small cell base station interference amount ratio. In this case, the transmission power instruction unit 122 sets an adjustment coefficient for adjusting the transmission power of the small cell downlink (hereinafter, referred to as "transmission power adjustment coefficient") in the small cell base station 300 so that the SINR in the radio terminal 200 would be equal to or larger than $\beta$ [dB] being a predetermined decibel value.

Specifically, the transmission power instruction unit 122 uses the RSRP (large cell base station to large cell terminal) which is received by the radio communication unit 110 as S (large cell terminal) being a field intensity at which the radio terminal 200 receives a signal from the large cell base station 100. Alternatively, the transmission power instruction unit 122 uses a value which is obtained by dividing the transmission power of the large cell base station 100 by the downlink propagation loss as S (large cell terminal).

The SINR corresponding to the large cell downlink in the radio terminal 200 is obtained by S (large cell terminal)/I (large cell terminal). Thus, the transmission power instruction unit 122 determines $\gamma$ fulfilling the following equation as a transmission power adjustment coefficient.

$$S(\text{large cell terminal})/(I(\text{large cell terminal})+(\gamma-1)\times \text{RSRP (small cell base station to large cell terminal)})\geq \beta \quad \text{[Equation 1]}$$

However, if there is no $\gamma$ fulfilling the above equation, the transmission power instruction unit 122 sets the transmission power adjustment coefficient at 0. The $\beta$ [dB] is predetermined in the radio communication system 1 and stored in the storage unit 130. Furthermore, the transmission power instruction unit 122 transmits the transmission power adjustment coefficient to the small cell base station 300 corresponding to the small cell base station interference amount ratio used for calculating the transmission power adjustment coefficient through the wired communication unit 140 and the core network 500.

On the other hand, when the small cell base station interference amount ratio is less than the threshold $\alpha$, it is regarded that the radio terminal 200 is not receiving considerable interference from the small cell base station 300 corresponding to the small cell base station interference amount ratio. In this case, the transmission power instruction unit 122 sets a transmission power adjustment coefficient whose value is equal to or larger than 1 and transmits the transmission power adjustment coefficient to the corresponding small cell base station 300 through the wired communication unit 140 and the core network 500.

It should be noted that when the radio terminal 200 is receiving interference from multiple small cell base stations 300, and, therefore, RSRPs (small cell base station to large cell terminal) corresponding to the respective multiple small cell base stations 300 are acquired to calculate the small cell base station interference amount ratio for each small cell base station 300, the transmission power instruction unit 122 sets the transmission power adjustment coefficient for each small cell base station 300. In this case, which the transmission power adjustment coefficient should be transmitted to which the small cell base station 300 can be identified with the ID contained in the RSRP (small cell base station to large cell terminal) corresponding to the small cell base station 300.

Upon receiving the transmission power adjustment coefficient from the transmission power instruction unit 122, the small cell base station 300 multiplies the transmission power adjustment coefficient by the value of the transmission power of the small cell downlink at that time point and uses the resultant value as a new value of the transmission power of the small cell downlink.

It should be noted that when the small cell base station 300 receives multiple transmission power adjustment coefficients from the large cell base station 100 during a past predetermined period, the smallest transmission power adjustment coefficient among the multiple transmission power adjustment coefficients is multiplied by the value of the transmission power of the small cell downlink at that time point and the resultant value can be used as a new value of the transmission power of the small cell downlink. In addition, when the small cell base station 300 receives a transmission power adjustment coefficient from the large cell base station 100 and also receives a transmission power adjustment coefficient from an unillustrated different large cell base station, the smallest transmission power adjustment coefficient among the multiple transmission power adjustment coefficients is multiplied by the value of the transmission power of the small cell downlink at that time point and the resultant value can be used as a new value of the transmission power of the small cell downlink.

However, when the calculated new value of the transmission power of the small cell downlink exceeds an upper-limit value, the small cell base station 300 uses the new value of the transmission power of the small cell downlink as the upper-limit value. On the other hand, when the calculated new value of the transmission power of the small cell downlink is less than the a lower-limit value, the small cell base station 300 uses the new value of the transmission power of the small cell downlink as the lower-limit value.

(2) Operation of Radio Communication System

Figure 3:
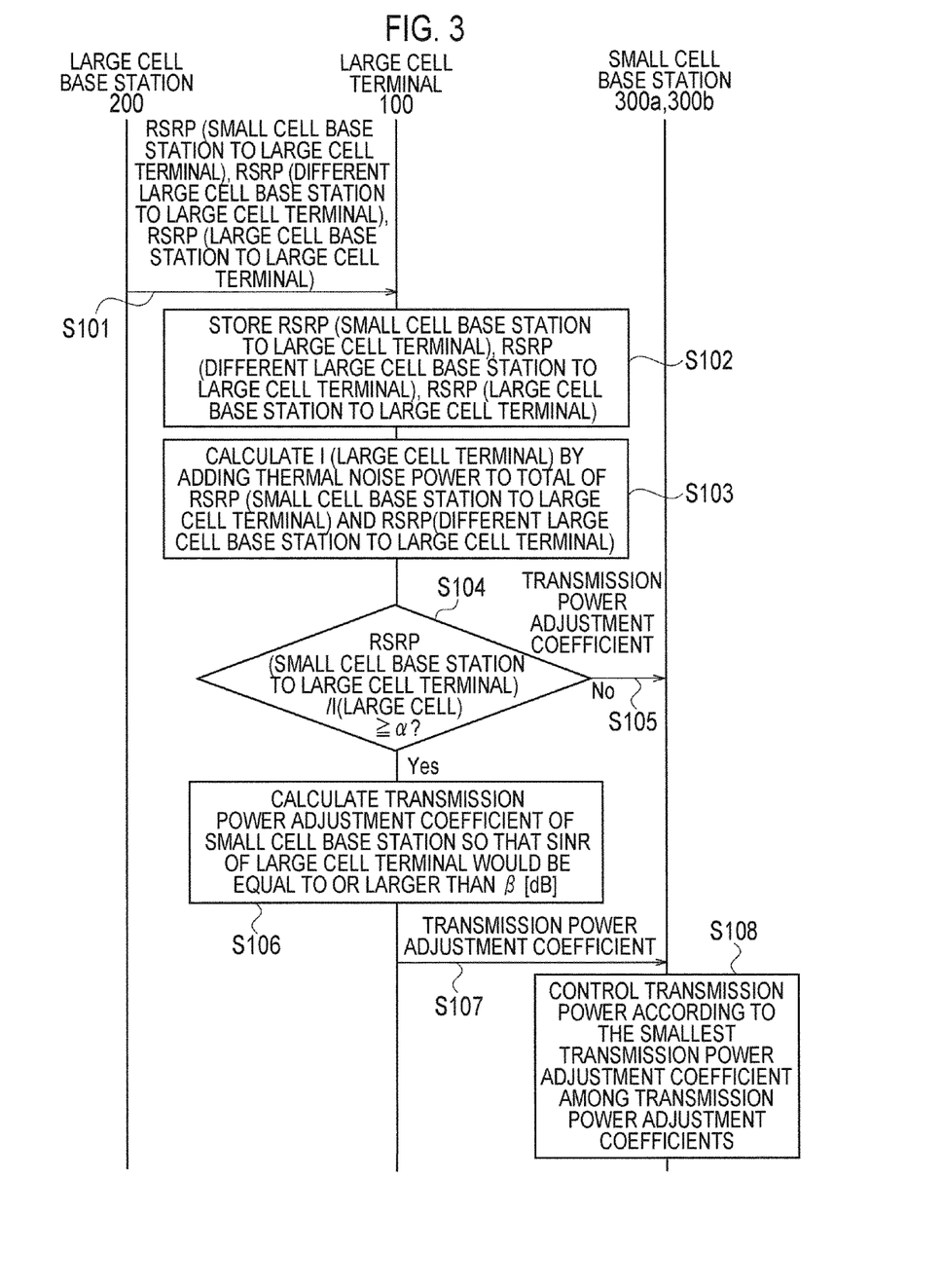
FIG. 3 is a sequence diagram showing a first operational example of the radio communication system according to the embodiment of the present invention.

Hereinafter, the operation of the radio communication system 1 is described. FIG. 3 is a sequence diagram showing a first operational example of the radio communication system 1.

At step S101, a radio terminal 200 which is connected to a large cell base station 100 measures RSRP (small cell base station to large cell terminal), RSRP (different large cell base station to large cell terminal), and RSRP (large cell base station to large cell terminal) and transmits each measured RSRP to the large cell base station 100. The large cell base station 100 receives the RSRP (small cell base station to large cell terminal), the RSRP (different large cell base station to large cell terminal), and the RSRP (large cell base station to large cell terminal) from the radio terminal 200.

At step S102, the large cell base station 100 stores the received RSRP (small cell base station to large cell terminal), RSRP (different large cell base station to large cell terminal), and RSRP (large cell base station to large cell terminal). Furthermore, at step S103, the large cell base station 100 calculates the total of the RSRP (small cell base station to large cell terminal) and the RSRP (different large cell base station to large cell terminal) and adds a thermal noise power value to the total to calculate I (large cell terminal).

At step S104, the large cell base station 100 divides the RSRP (small cell base station to large cell terminal) by I (large cell terminal) to calculate a small cell base station interference amount ratio and, furthermore, determines if the small cell base station interference amount ratio is equal to or larger than the threshold $\alpha$.

When the small cell base station interference amount ratio is less than the threshold $\alpha$, at step S104, the large cell base station 100 transmits a transmission power adjustment coefficient which is a value equal to or larger than 1 to the corresponding small cell base station 300.

On the other hand, when the small cell base station interference amount ratio is equal to or larger than the threshold $\alpha$, at step S106, the large cell base station 100 calculates a transmission power adjustment coefficient so that the SINR in the radio terminal 200 would be equal to or larger than $\beta$ [dB]. Furthermore, at step S107, the large cell base station 100 transmits the calculated transmission power adjustment coefficient to the corresponding small cell base station 300.

At step S106 or step S107, the small cell base station 300 receives the transmission power adjustment coefficient. At step S108, the small cell base station 300 multiplies the value of the transmission power of the small cell downlink at that time point by the smallest transmission power adjustment coefficient among multiple transmission power adjustment coefficients which are received from the large cell base station 100 during a past predetermined period or by the smallest transmission power adjustment coefficient among multiple transmission power adjustment coefficients which are received from the large cell base station 100 and the unillustrated different large cell base station. Then, the small cell base station 300 uses the resultant value as a new value of the transmission power of the small cell downlink.

Figure 4:
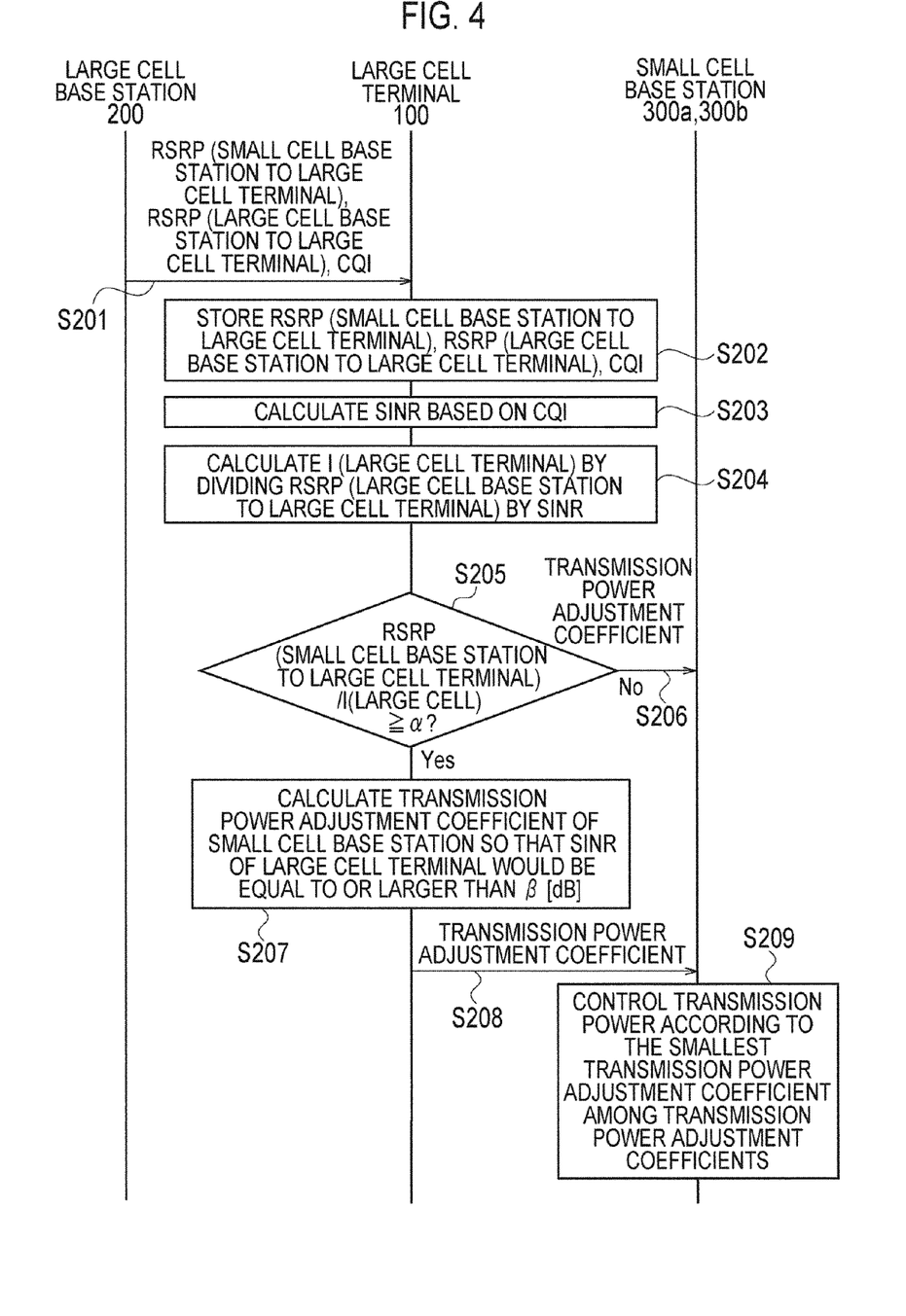
FIG. 4 is a sequence diagram showing a second operational example of the radio communication system according to the embodiment of the present invention.

FIG. 4 is a sequence diagram showing a second operational example of the radio communication system 1.

At step S201, a radio terminal 200 which is connected to a large cell base station 100 measures RSRP (small cell base station to large cell terminal) and RSRP (large cell base station to large cell terminal) and transmits each measured RSRP to the large cell base station 100. In addition, the radio terminal 200 obtains a CQI from a SINR corresponding to a measured large cell downlink and transmits the CQI to the large cell base station 100. The large cell base station 100 receives the RSRP (small cell base station to large cell terminal), the RSRP (large cell base station to large cell terminal), and the CQI.

At step S202, the large cell base station 100 stores the received RSRP (small cell base station to large cell terminal), RSRP (large cell base station to large cell terminal), and CQI. Furthermore, at step S203, the large cell base station 100 calculates a SINR (Signal to Interference and Noise Ratio) corresponding to the large cell downlink in the radio terminal 200 on the basis of the stored CQI.

At step S204, the large cell base station 100 calculates I (large cell terminal) by dividing the RSRP (large cell base station to large cell terminal) by the SINR.

The operations at step S205 to step S209 are the same as the operations at step S104 to step S108 in FIG. 3, and the description thereof is omitted.

Figure 5:
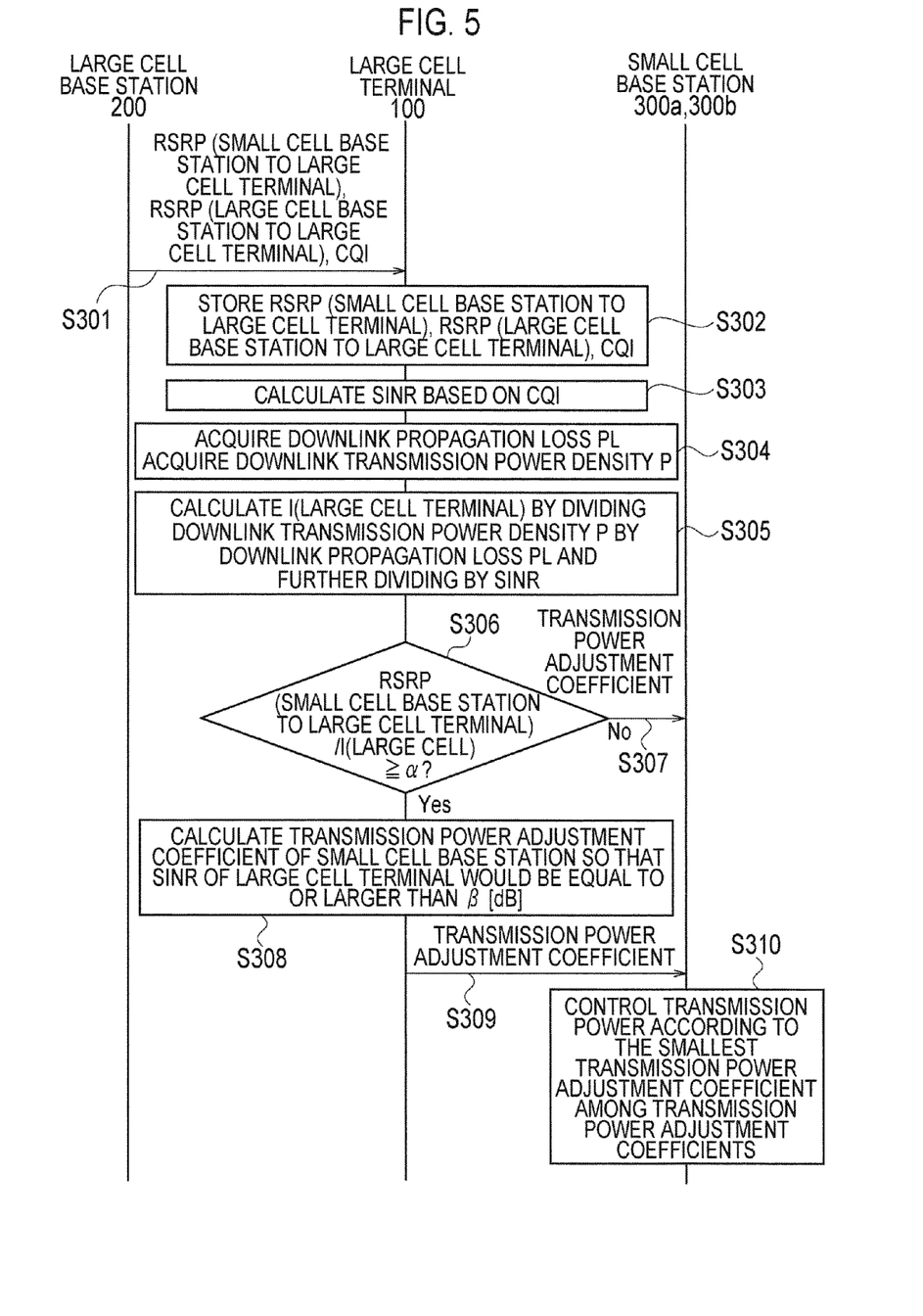
FIG. 5 is a sequence diagram showing a third operational example of the radio communication system according to the embodiment of the present invention.

FIG. 5 is a sequence diagram showing a third operational example of the radio communication system 1.

At step S301, a radio terminal 200 which is connected to a large cell base station 100 measures RSRP (small cell base station to large cell terminal) and RSRP (large cell base station to large cell terminal) and transmits each measured RSRP to the large cell base station 100. In addition, the radio terminal 200 obtains a CQI from a SINR corresponding to a measured large cell downlink and transmits the CQI to the large cell base station 100. The large cell base station 100 receives the RSRP (small cell base station to large cell terminal), the RSRP (large cell base station to large cell terminal), and the CQI.

At step S302, the large cell base station 100 stores the received RSRP (small cell base station to large cell terminal), RSRP (large cell base station to large cell terminal), and CQI. Furthermore, at step S303, the large cell base station 100 calculates a SINR (Signal to Interference and Noise Ratio) corresponding to the large cell downlink in the radio terminal 200 on the basis of the stored CQI.

At step S304, the large cell base station 100 acquires a downlink propagation loss PL and a downlink transmission power density P. At step S305, the large cell base station 100 calculates I (large cell terminal) by dividing the downlink transmission power density P by the downlink propagation loss PL and further by dividing the value obtained through the division by the SINR.

The operations at step S306 to step S310 are the same as the operations at step S104 to step S108 in FIG. 3, and the description thereof is omitted.

It should be noted that when there are multiple radio terminals connected to the large cell base station 100, the operations shown in any of FIGS. 3 to 5 are performed for each radio terminal.

(3) Advantageous Effects

In the radio communication system 1 according to the embodiment, the large cell base station 100 calculates the small cell base station interference amount ratio which is a ratio of the RSRP (small cell base station to large cell terminal) being the amount of interference which is received from the small cell base station 300, to I (large cell terminal) regarded as the total amount of interference which is received by the radio terminal 200 being connected to the large cell base station 100. Furthermore, when the small cell base station interference amount ratio is equal to or large than the threshold α, it is regarded that the large cell base station 100 is receiving considerable interference from the small cell base station 300 corresponding to the small cell base station interference amount ratio. The large cell base station 100 then sets the transmission power adjustment coefficient so that the SINR in the radio terminal 200 would be equal to or larger than β [dB] being a predetermined decibel value, and transmits the set transmission power adjustment coefficient to the small cell base station 300.

With this operation, when the small cell base station interference amount ratio corresponding to the radio terminal 200 which is connected to the large cell base station 100 is large and the interference that the radio terminal 200 receives from the small cell base station 300 is considerable, the transmission power of the small cell downlink in the small cell base station 300 is properly controlled so that the interference would be decreased. On the other hand, when the small cell base station interference amount ratio is small and the interference that the radio terminal 200 receives from the small cell base station 300 is not considerable, the large cell base station 100 can properly decrease the interference that the radio terminal 200 connected to the large cell base station 100 receives from the small cell base station 300, by maintaining or increasing the transmission power of the small cell downlink in the small cell base station 300, instead of unnecessarily decreasing the communication quality of the small cell base station 300.

(4) Other Embodiments

The present invention has been described by using the above-described embodiments. However, it should not be understood that the description and the drawings which constitute one part of the disclosure are intended to limit the invention. Various alternative embodiments, examples, and operational techniques will be apparent for those who are skilled in the art from this disclosure.

In the above-described embodiments, the transmission power instruction unit 122 transmits the transmission power adjustment coefficient to the small cell base station 300. However, instead of the transmission power adjustment coefficient, the transmission power instruction unit 122 may transmit any one of the value of the maximum transmission power of the small cell base station 300 and a variable determining the maximum transmission power of the small cell base station 300.

Specifically, when the small cell base station interference amount ratio is equal to or larger than the threshold α, the transmission power instruction unit 122 sets any one of the value of the maximum transmission power of the small cell base station 300 and the variable determining the maximum transmission power of the small cell base station 300 so that the SINR in the radio terminal 200 would be equal to or larger than β [dB] being a predetermined decibel value.

On the other hand, when the small cell base station interference amount ratio is less than the threshold α, the transmission power instruction unit 122 uses the upper-limit value of the transmission power of the small cell base station 300 as the value of the maximum transmission power. Alternatively, the transmission power instruction unit 122 uses a variable determining the upper-limit value of the transmission power of the small cell base station 300 as the variable determining the maximum transmission power of the small cell base station 300.

Further, the transmission power instruction unit 122 transmits any one of the value of the maximum transmission power of the small cell base station 300 and the variable determining the maximum transmission power of the small cell base station 300, to the corresponding small cell base station 300 through the wired communication unit 140 and the core network 500.

When receiving the value of the maximum transmission power from the transmission power instruction unit 122, the small cell base station 300 uses a power value equal to or smaller than the value of the maximum transmission power, as a new value of the transmission power of the small cell downlink. Alternatively, when receiving the variable determining the maximum transmission power from the transmission power instruction unit 122, the small cell base station 300 uses a power value equal to or smaller than the value of the maximum transmission power determined by the variable, as a new value of the transmission power of the small cell downlink.

In the above-described embodiment, the large cell base station 100 compares the small cell base station interference amount ratio with the threshold α and sets the transmission power adjustment coefficient, the value of the maximum transmission power of the small cell base station 300, or the variable determining the maximum transmission power of the small cell base station 300 according to the comparison result. However, instead of performing the comparison with the threshold α, the small cell base station 300 may be so instructed that the larger the small cell base station interference amount ratio becomes, the smaller the transmission power of the small cell downlink in the corresponding small cell base station 300 becomes.

Also, in the embodiment, the large cell base station 100 calculates the small cell base station interference amount ratio and gives the instruction of the transmission power adjustment to the small cell base station 300. However, such operations may be performed by the upper level device 400.

In this case, the upper level device 400 includes the ratio acquisition unit 121 and the transmission power instruction unit 122 within its controller. The upper level device 400 then receives RSRP (small cell base station to large cell terminal) and a CQI from the small cell base station 300 through the large cell base station 100 and receives the downlink propagation loss from the large cell base station 100. Furthermore, the ratio acquisition unit 121 calculates the small cell base station interference amount ratio by properly using these RSRP (small cell base station to large cell terminal), CQI, and downlink propagation loss. The transmission power instruction unit 122 sets the transmission power adjustment coefficient, the value of the maximum transmission power of the small cell base station 300, or the variable determining the maximum transmission power of the small cell base station 300 on the basis of the small cell base station interference amount ratio, and transmits it to the small cell base station 300. Alternatively, it is also possible that the large cell base station 100 sets the transmission power adjustment coefficient, the value of the maximum transmission power of the small cell base station 300, or the variable determining the maximum transmission power of the small cell base station 300, and the upper level device 400 transmits the notified transmission power adjustment coefficient, the notified value of the maximum transmission power of the small cell base station 300, or the notified variable determining the maximum transmission power of the small cell base station 300, to the small cell base station 300.

In the above-described embodiments, the radio communication system 1 has the configuration based on the LTE Release 9 or LTE-Advanced. However, the radio communication system 1 may have the configurations based on other communication standards.

While various embodiments of the invention have been described above, it should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments but instead should be given the scope provided by the claims below.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

What is claimed is:

1. A radio communication system in which a small cell base station forming a small cell smaller than a large cell formed by a large cell base station is installed within the large cell and a large cell radio terminal is connected to the large cell base station, wherein a network device formed of at least one of the large cell base station and a an upper level device of the large cell base station comprises:

a ratio acquisition unit configured to acquire a ratio of an amount of interference that the large cell radio terminal receives from the small cell base station to a first amount of interference being regarded as a total amount of interference that the large cell radio terminal receives, wherein the amount of interference that the large cell radio terminal receives from the small cell base station includes a field intensity at which the large cell radio terminal receives a reference signal from the small cell base station, wherein the ratio acquisition unit calculates the first amount of interference by using a field intensity at which the large cell radio terminal receives a reference signal from the small cell base station, a field intensity at which the large cell radio terminal receives a reference signal from a large cell base station different from the large cell base station to which the large cell radio terminal is connected; and an instruction unit configured to instruct the small cell base station to control transmission power of a small cell downlink being a downlink in the small cell base station, based on the ratio acquired by the ratio acquisition unit.

2. The radio communication system according to claim 1, wherein
the instruction unit instructs the small cell base station to control the transmission power of the small cell downlink so that a communication quality of a downlink from the large cell base station to the large cell radio terminal becomes a predetermined value.

3. The radio communication system according to claim 1, wherein
the instruction unit instructs the small cell base station to decrease the downlink transmission power when the ratio acquired by the ratio acquisition unit exceeds a predetermined threshold.

4. The radio communication system according to claim 1, wherein
the instruction unit transmits any one of a value of maximum transmission power of the small cell base station and a variable determining the maximum transmission power of the small cell base station, to the small cell base station.

5. A large cell base station which forms a large cell where a small cell base station forming a small cell smaller than the large cell is installed, a large cell radio terminal being connected to the large cell base station, the large cell base station comprising:
a ratio acquisition unit configured to acquire a ratio of an amount of interference that the large cell radio terminal receives from the small cell base station to a first amount of interference being regarded as a total amount of interference that the large cell radio terminal receives, wherein the amount of interference that the large cell radio terminal receives from the small cell base station includes a field intensity at which the large cell radio terminal receives a reference signal from the small cell base station, wherein the ratio acquisition unit calculates the first amount of interference by using a field intensity at which the large cell radio terminal receives a reference signal from the small cell base station, a field intensity at which the large cell radio terminal receives a reference signal from a large cell base station different from the large cell base station to which the large cell radio terminal is connected; and
an instruction unit configured to instruct the small cell base station to control transmission power of a small cell downlink being a downlink in the small cell base station, based on the ratio acquired by the ratio acquisition unit.

6. A communication control method in a large cell base station which forms a large cell where a small cell base station forming a small cell smaller than the large cell is installed, a large cell radio terminal being connected to the large cell base station, the method comprising:
the large cell base station acquiring a ratio of an amount of interference that the large cell radio terminal receives from the small cell base station to a first amount of interference being regarded as a total amount of interference that the large cell radio terminal receives, wherein the amount of interference that the large cell radio terminal receives from the small cell base station includes a field intensity at which the large cell radio terminal receives a reference signal from the small cell base station, wherein the ratio acquisition unit calculates the first amount of interference by using a field intensity at which the large cell radio terminal receives a reference signal from the small cell base station, a field intensity at which the large cell radio terminal receives a reference signal from a large cell base station different from the large cell base station to which the large cell radio terminal is connected; and
the large cell base station instructing the small cell base station to control transmission power of a small cell downlink being a downlink in the small cell base station, based on the acquired ratio.

7. The radio communication system according to claim 2, wherein
the instruction unit instructs the small cell base station to decrease the downlink transmission power when the ratio acquired by the ratio acquisition unit exceeds a predetermined threshold.

* * * * *